(No Model.)
W. J. STILL.
RECTIFIER FOR ELECTRICAL CURRENTS.
No. 547,043. Patented Oct. 1, 1895.
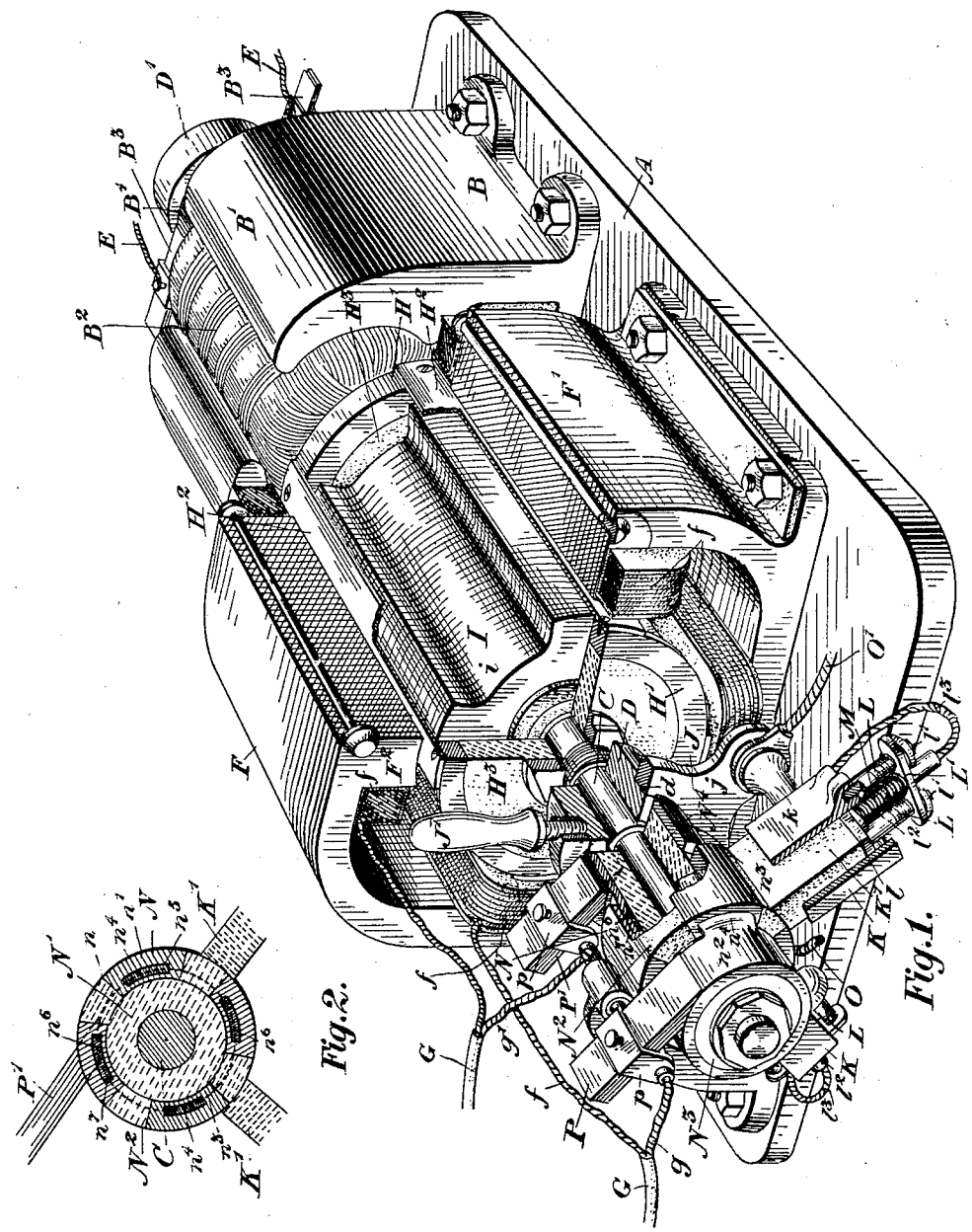
Witnesses.
W. J. Withrow
E. R. Case
Inventor:
W. J. Still
by Fetherstonhaugh & Co.
Attys.

UNITED STATES PATENT OFFICE.

WILLIAM JOSEPH STILL, OF TORONTO, CANADA, ASSIGNOR TO WILLIAM BURROWES CLOSE, OF SAME PLACE.

RECTIFIER FOR ELECTRICAL CURRENTS.

SPECIFICATION forming part of Letters Patent No. 547,043, dated October 1, 1895.

Application filed December 24, 1894. Serial No. 532,811. (No model.)

*To all whom it may concern:*

Be it known that I, WILLIAM JOSEPH STILL, electrician, of the city of Toronto, in the county of York, in the Province of Ontario, Canada, have invented certain new and useful Improvements in Rectifiers for Electrical Currents, of which the following is the specification.

My invention relates to improvements in rectifiers for converting an alternating current into a direct or continuous current, and the object of the invention is to devise such a rectifier as will register with the varying phases of the current in such a manner that the connection of the commutator with the brushes will be changed as to the alternations exactly on the zero-line of the cycle of undulations, and thereby prevent the burning out of the rectifying commutator; and it consists, essentially, of a motor run from an independent source, a dynamo, the fields of which are run from a shunt-circuit from the alternating-current wires, a commutator of peculiar construction having its brushes connected to the main alternating-current wires, and brushes for leading off the continuous current, the armatures of the motor and dynamo and the peculiarly-constructed commutator being all secured to a common shaft and the different parts being otherwise constructed, as hereinafter more particularly explained.

Figure 1 is a perspective view of my alternating-current-rectifying machine. Fig. 2 is a cross-section through the peculiar form of commutator.

In the drawings like letters of reference indicate corresponding parts in each figure.

Heretofore in machines of this class the great difficulty has been that the commutator would be burned out or destroyed by sparking on account of the alternating current being cut during the period that the current is flowing and not as it should be when the cycle of the alternating undulations are at zero—that is to say, when there is no current flowing. It is with the object of providing such a rectifier that the cycle of the undulations of the alternating current will be cut at the zero-point and thereby prevent any sparking, which is injurious to the commutator at the period that the change from the alternating current to the continuous current is being made that my invention is chiefly designed.

A is the bed-plate of the machine; B, the motor, provided with the fields B', armature $B^2$, ordinary brushes $B^3$, and commutator $B^4$. The armature $B^2$ is secured to the shaft C, which is journaled in the standards D and D', secured to the bed-plate. The brushes of the motor B are connected by the wires E to any suitable electrical source of power, which may be either storage-battery or dynamo.

F is an alternating-current dynamo, the field F' of which is preferably laminated, as indicated. The fields of the dynamo F are sectionally cut, so as to exhibit the form of the armature. The field-magnet cores $F^2$ are surrounded by the usual coils $f$, in this instance there being four coils, which are connected together in series. The ends of the coils $f$ are connected to the main alternating-current wires G.

H is the armature of the alternating-current dynamo, which consists of two metallic rings H', connected together by four cross-bars $H^2$. The rings are supported upon the shaft by the end disks $H^3$, to which the rings are secured and which are made of insulating material. In this instance I show four cross-bars $H^2$, and these correspond to the number of field-magnets.

I is a core, which is held in position by the lines of force, and is preferably made laminated, as indicated, and is constructed with recesses $i$, extending between the field-magnets. This core is loose on the shaft and maintained in a stationary position by the lines of force.

J is a brush-support, which is for the major portion ring-shaped and supported in an annular groove $d$, made in the end of the standard D. The brush-support has two arms $j$, one of which is shown.

J' is a handle secured to the top of the ring-support J.

K is the brush-holder, which is supported at the outer end of the spindle $k$, which is pivotally held in the arm $j$.

K' is the carbon brush, which has secured to its outer end the metallic end $l$.

L are pins secured in the brush-holder K, one at each side of the brush.

L' is a cross-bar, through which the outer threaded ends of the pin freely extend.

l' are thumb-nets screwed onto the threaded ends of the pins L.

$l^2$ is a spindle, which is secured in the metallic end l of the brush and extends freely through the central part of the cross-bar L'.

M is a spiral spring, which surrounds the spindle $l^2$ and extends between the cross-bar L' and the end of the brush and is designed to keep the brush K', which is preferably made of carbon, against the commutator N.

$l^3$ is a conducting-wire leading from the end of the spindle to the brush-holder K.

Although I describe only one brush, with the means by which it is supported, it will of course be understood that the other brush is supported in exactly the same way.

O and O' are the wires leading from the carbon brushes.

The commutator N has its inner portion N' next the shaft made of insulating material. The central portion $N^2$ is cylindrical in shape, as are also the two end portions $N^3$ and $N^4$; but the end portions are of reduced diameter. In the central portion $N^2$, I provide, as shown, four recesses n, in which are inserted metallic sections n'. The end portion $N^3$, I provide with a collar $n^2$, and the end portion $N^4$, I provide with a collar $n^3$. The collar $n^2$ has laterally-extending tongues $n^4$, situated diametrically opposite each other and extending into recesses $n^5$ in the sections n'. (See Fig. 2.) The collar $n^3$ has also laterally-extending projections $n^6$, which extend into recesses $n^7$ in the alternate sections n'.

P is a brush which rests on the collar $n^2$ and is supported in the pivoted brush-holder p.

P' is a brush which rests on the collar $n^3$ and is supported in a pivoted brush-holder p'.

g and g' are the alternating-current wires leading from the main wire G to the brushes P and P'. The alternating current coming in on the wires g and g' and the collars $n^2$ and $n^3$, respectively, is carried out by the brushes K and wires O and O' as a continuous current.

The alternating current is changed into a continuous current through the commutator N, constructed as described in the following manner: In order to provide for the changing of the alternating current into a continuous current without any detrimental effect to or destroying of the commutator, it is necessary that the cycle of undulations of the alternating current must be cut at zero-points or during the period that the current is not flowing. The armature $B^2$ of the motor D is adapted to have a tendency to rotate the shaft at a high rate of speed—in fact, at such a rate as to be slightly in excess as to number of commutations to the corresponding undulations of the alternating current. It is therefore necessary to retard the rotation of the shaft, so that it will by the commutator at all periods and under varying conditions of load change the alternating current entering into the commutator to a continuous current at zero-points in the cycle of the undulations of the alternating current, or, in other words, at the infinitesimal periods at which no current is flowing. To produce this effect, the shaft must be continuously and varyingly retarded in its rotation at all periods when the shaft is rotating at such a speed as would cause the commutator to change the alternating current into a continuous current at that point in the alternations ahead of the zero-point or when the current is flowing. To effect this, and thereby practically prevent any danger of sparking and entirely get rid of excessive sparking, I provide, as hereinbefore described, the armature H, secured to the shaft and comprising end metallic rings and cross-conducting bars, which thus form a short-circuited armature.

The metallic sections of the commutators, it will be noticed on reference to Fig. 2, are set as to direction rotation circumferentially behind the position of the corresponding armature-bars of the alternating-current dynamo, although it may be only very slightly so. As the short-circuited armature of the dynamo is running in a strong alternating field, a retarding effect is produced upon the conducting-bars by the magnets in such field a little before the magnetism of the magnet falls to the zero-point. Consequently a retarding effect is produced upon the rotation of the armature of the dynamo, and therefore the common shaft is continuously and varyingly retarded to suit the alternations, so that the alternating current is changed into a constant current at exactly the zero-points in the cycle of undulations, and sparking of the commutator is practically prevented.

I show four metallic sections in the commutator to coact with the brushes P and P' and K K'; but it will be understood that the number of sections will depend on the number of alternations per minute or the speed of driving the shaft per minute, there being, of course, more sections if the shaft is caused to run slower and less if such shaft is caused to run at a greater speed.

The size of my rectifier will, of course, depend upon the volume of current to be rectified.

What I claim as my invention is—

1. In a rectifier for alternating currents the combination with the shaft driven by a suitable motor so that it will have a tendency to revolve slightly in excess as to number of commutations of the number of alternations of the current in the same time and a commutator suitably formed and secured on the common shaft connected by brushes to the alternating current wires and having co-acting brushes to lead off the continuous current, of a dynamo having a strong alternating field deriving its current from the main alternating current wires and having a short-circuited armature secured to the common shaft whereby the rotation of such shaft is continuously and varyingly retarded to bring down the commutations at all periods into unison with the alternations of the current so that the continuous cycle of undulations is practically cut at the zero points as and for the purpose specified.

2. The combination with the shaft driven by an electric motor deriving current from independent source and having the armature secured on the shaft and a commutator insulated from the shaft and having an equal number of metallic sections connected to one brush of the alternating current wire and an equal number connected to the other brush and two brushes located on sections of different polarity to carry off the continuous current, of a dynamo having the field magnets connected in series and forming a shunt field from the alternating current wires and an armature having end rings connected together by conducting bars, corresponding to the number of field magnets, and insulated and supported upon the common shaft by end disks and an interior core maintained stationary on the shaft, the speed of the shaft being continuously retarded by the short-circuited armature of the dynamo as and for the purpose specified.

3. The combination with the shaft, the motor, B, having the armature, $B^2$, secured on the shaft and the commutator insulated from the shaft and provided with metallic sections in the central portion, end rings having tongues extending into recesses in the sections diametrically opposite each other, brushes held in contact with the end rings and connected by wires to the main alternating current wires and two carbon brushes located upon sections of opposite polarity and carrying off the continuous current from the commutator, of a dynamo the field magnets of which derive current from a shunt from the main alternating current wires and a short circuited armature composed of metallic end rings insulated and supported on the common shaft and connected together by conducting bars, and a cylindrical core loose on the shaft and having recesses made across it between the field magnets whereby the lines of force maintain such core from rotating, all the parts being arranged to co-act as and for the purpose specified.

WILLIAM JOSEPH STILL.

Witnesses:
B. BOYD,
E. R. CASE.